US012182562B2

(12) United States Patent
Ben-Yair

(10) Patent No.: US 12,182,562 B2
(45) Date of Patent: Dec. 31, 2024

(54) MANAGING PATCHED GLOBAL ASSEMBLY CACHE (GAC) METHOD FOR WEBSITES RUNNING IN A .NET FRAMEWORK ENVIRONMENT

(71) Applicant: HCL Technologies Limited, New Delhi (IN)

(72) Inventor: Gal Ben-Yair, Givaat Shmuel (IL)

(73) Assignee: HCL Technologies Limited, New Delhi (IN)

( * ) Notice: Subject to any disclaimer, the term of this patent is extended or adjusted under 35 U.S.C. 154(b) by 139 days.

(21) Appl. No.: 17/970,598

(22) Filed: Oct. 21, 2022

(65) Prior Publication Data

US 2024/0134623 A1   Apr. 25, 2024
US 2024/0231791 A9   Jul. 11, 2024

(51) Int. Cl.
*G06F 8/65* (2018.01)
*G06F 15/173* (2006.01)

(52) U.S. Cl.
CPC .......... *G06F 8/65* (2013.01); *G06F 15/17331* (2013.01)

(58) Field of Classification Search
CPC ........ G06F 8/65; G06F 15/17331; G06F 8/30; G06F 8/36; G06F 8/20; G06F 8/70; G06F 15/16; G06F 15/00
(Continued)

(56) References Cited

U.S. PATENT DOCUMENTS 7,823,186 B2   10/2010   Pouliot
8,392,904 B2 *  3/2013   Garcia ..................... G06F 8/65
                                                       717/172

(Continued)

FOREIGN PATENT DOCUMENTS

CN   102592082 B   7/2015
EP   2340481 B1   6/2018
RU   2520344 C2   6/2014

OTHER PUBLICATIONS

Mao et al., "A Robust Link-Translating Proxy Server Mirroring the Whole Web", 2011, [Online], pp. 30-42, [Retrieved from internet on Aug. 30, 2024], <chrome-extension://efaidnbmnn-nibpcajpcglclefindmkaj/https://dl.acm.org/doi/pdf/10.1145/1964144.1964149> (Year: 2011).*

(Continued)

*Primary Examiner* — S. Sough
*Assistant Examiner* — Zengpu Wei
(74) *Attorney, Agent, or Firm* — Kendal M. Sheets

(57) ABSTRACT

The invention relates to method and system for managing patched Global assembly cache methods for websites running in .NET framework environment. The method includes initiating a second domain when a website hosted on webserver is loaded for first-time; creating a copy of each of the one or more .NET modules for reverse patching; creating a runner method to call the copy of each of the one or more .NET modules; creating a patched method corresponding to each of the one or more .NET modules in the second domain; calling, in run-time, the patched method in second domain upon encountering the corresponding .NET module. Further, calling patched method includes calling the runner method via reflection in run-time. Calling the runner method includes calling the copy of the corresponding .NET module via reverse patching in run-time. The method further includes monitoring, in real-time, behaviour of the patched method in the second domain.

18 Claims, 7 Drawing Sheets

(58) Field of Classification Search
USPC .......................................................... 717/172
See application file for complete search history.

(56) References Cited

U.S. PATENT DOCUMENTS

| | | | |
|---|---|---|---|
| 8,578,487 B2 | 11/2013 | Soeder | |
| 8,584,102 B2 | 11/2013 | Need et al. | |
| 10,635,415 B2 | 4/2020 | Soeder | |
| 2005/0055670 A1* | 3/2005 | Otto | G06F 8/10 |
| | | | 717/121 |
| 2007/0169025 A1* | 7/2007 | Moore | H04L 67/34 |
| | | | 717/139 |
| 2015/0007156 A1 | 1/2015 | Tkach et al. | |
| 2018/0131574 A1* | 5/2018 | Jacobs | H04L 43/0817 |
| 2022/0353109 A1* | 11/2022 | Elliott | G06F 8/60 |

OTHER PUBLICATIONS

Patching Assemblies in the Global Assembly Cache (https://docs.revenera.com/installshield24helplib/helplibrary/IHelpPatchGAC.htm).

* cited by examiner

MANAGING PATCHED GLOBAL ASSEMBLY CACHE (GAC) METHOD FOR WEBSITES RUNNING IN A .NET FRAMEWORK ENVIRONMENT

TECHNICAL FIELD

Generally, the invention relates to application security testing. More specifically, the invention relates to a method and system for managing patched Global assembly cache (GAC) methods for websites running in a .NET framework environment

BACKGROUND

With an exponential increase in accessibility of internet resources globally, web applications across the worldwide web are encountering an ever-increasing traffic. Traditionally, web applications are debugged and break points are inserted into specific locations of the source code to monitor or track data flow in the web applications. However, such methods are not efficient as they may severely affect user experience.

When web sites run in a .NET web server (such as, Internet Information Services (IIS) or IIS express), they are often destroyed and recreated in runtime, as defined by the configuration of the web server. Further, it may be impossible to un-patch a patched method. Therefore, when a web site is created, patched and destroyed, then calling the patched methods may attempt to call a code that no longer exists in memory. As a result, the web server may fail or crash. This makes direct patching of methods in a web environment unfeasible.

Therefore, there is a requirement in the present state of art to develop a method and a system that provides feasibility in patching websites running in a .NET framework environment and tracking data in the .NET applications. h

SUMMARY

In one embodiment, a method for managing patched Global assembly cache (GAC) methods for websites running in a .NET framework environment is disclosed. The method may include initiating a second domain when a website hosted on a web-server is loaded for a first-time. The website may include a set of .NET modules, and one or more of the set of .NET modules may be GAC methods of interest. The method may further include creating a copy of each of the one or more .NET modules for reverse patching. The method may further include creating a runner method to call the copy of each of the one or more .NET modules. The method may further include creating a patched method corresponding to each of the one or more of the set of .NET modules in the second domain. Further, creating the patched method for a .NET module may include inserting a preconfigured tracking code that may call the runner method in the website via reflection The method may further include calling, in run-time, the patched method in the second domain upon encountering the corresponding .NET module. It should be noted that calling the patched method may include calling the runner method via reflection in run time. Further, calling the runner method may include calling the copy of the corresponding .NET module via reverse patching in run-time. The method may further include monitoring, in real-time, a behaviour of the patched method in the second domain. The method may further include generating a notification when the website is unloaded. The notification may be provided to the monitoring server via standard notification mechanisms.

In another embodiment, a system for managing patched Global assembly cache (GAC) methods for websites running in a .NET framework environment is disclosed. The system may include a processor and a memory communicatively coupled to the processor to initiate a second domain when a website hosted on a web-server is loaded for a first-time. The website may include a set of .NET modules, and one or more of the set of .NET modules may be GAC methods of interest. The processor-executable instructions, on execution, may further cause the processor to create a copy of each of the one or more .NET modules for reverse patching. The processor-executable instructions, on execution, may further cause the processor to create a runner method to call the copy of each of the one or more .NET modules. The processor-executable instructions, on execution, may further cause the processor to create a patched method corresponding to each of the one or more of the set of .NET modules in the second domain. Further, creating the patched method for a .NET module may include inserting a preconfigured tracking code that may call the runner method in the website via reflection. The processor-executable instructions, on execution, may further cause the processor to call, in run-time, the patched method in the second domain upon encountering the corresponding .NET module. The processor-executable instructions, on execution, may further cause the processor to call the patched method by calling, in run-time, the runner method via reflection The processor-executable instructions, on execution, may further cause the processor to call the runner method by calling, in run-time, the copy of the corresponding .NET module via reverse patching. The processor-executable instructions, on execution, may further cause the processor to monitor, in real-time, a behaviour of the patched method in the second domain. The processor-executable instructions, on execution, may further cause the processor to generate a notification when the website is unloaded. The notification may be provided to the monitoring server via standard notification mechanisms.

In yet another embodiment, a non-transitory computer-readable medium storing computer-executable instruction for managing patched Global assembly cache (GAC) methods for websites running in a .NET framework environment is disclosed. The stored instructions, when executed by a processor, may cause the processor to perform operations including initiating a second domain when a website hosted on a web-server is loaded for a first-time. The website may include a set of .NET modules, and one or more of the set of .NET modules may be GAC methods of interest. The operations may further include creating a copy of each of the one or more .NET modules for reverse patching. The operations may further include creating a runner method to call the copy of each of the one or more .NET modules. The operations may further include creating a patched method corresponding to each of the one or more of the set of .NET modules in the second domain. Further, creating the patched method for a .NET module may include inserting a preconfigured tracking code that may call the runner method in the website via reflection. The operations may further include calling, in run-time, the patched method in the second domain upon encountering the corresponding .NET module. The operations may further include calling, in run-time, the runner method via reflection to call the patched method. The operations may further include calling, in run-time, the copy of the corresponding .NET module via reverse patching to call the runner method. The operations may further include monitoring, in real-time, a behaviour of the patched method in the second domain. The operations may further include generating a notification when the website is unloaded. The notification may be provided to the monitoring server via standard notification mechanisms.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
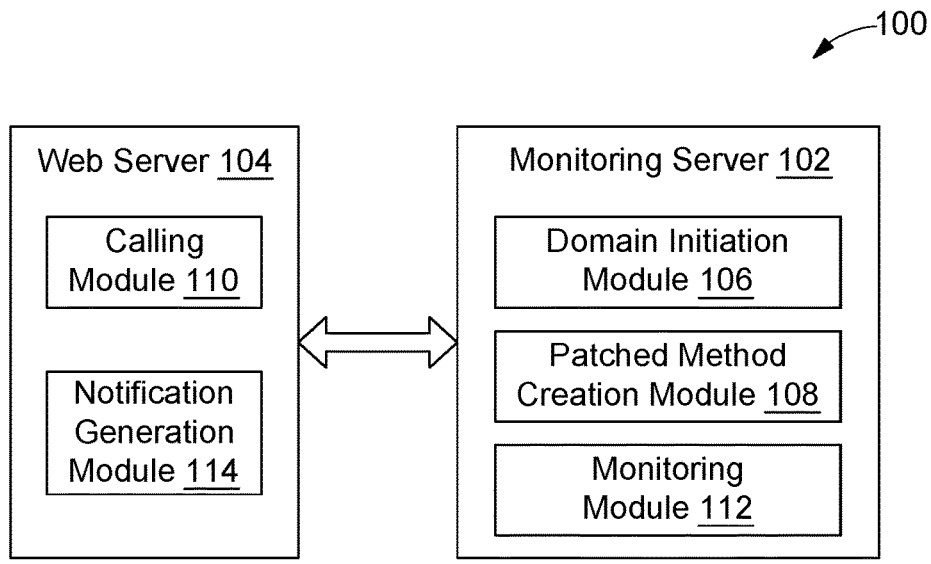
FIG. 1 illustrates a block diagram of a system for patching websites running in a .NET framework, in accordance with some embodiments of the present disclosure.

Referring now to FIG. 1, a system 100 for patching websites running in a .NET framework is illustrated, in accordance with some embodiments of the present disclosure. In some embodiments, the system 100 may include a monitoring server 102 and a web server 104 communicatively coupled to each other. The monitoring server 102 may further include a domain initiation module 106, a patched method creation module 108, and a monitoring module 112. The web server 104 may further include a calling module 110 and a notification generation module 114. Further, the system 100 may also include a data store (not shown in FIG. 1) in order to store intermediate results generated by the modules 106-114. In an embodiment, the monitoring server 102 may correspond to an Interactive Application Security Testing (IAST) domain and the web server 104 may correspond to a web domain. It should be noted that the web server 104 may host a website that may be accessed by a plurality of users in real-time. The monitoring server 102, through the various techniques disclosed in the present disclosure, may monitor behaviour of one or more components of the website without affecting experience of the plurality of users.

The domain initiation module 106 may be configured to initiate a second domain (i.e., the IAST domain). The second domain may be initiated when the website hosted on the web server 104 is loaded for a first-time. It may be noted that the website may have a set of .NET modules. The one or more modules from the set of .NET modules may be the modules of interest. The domain initiation module 106 may be communicatively coupled to the patched method creation module 108.

The patched method creation module 108 may be configured to create a patched method corresponding to each of the one or more of the set of .NET modules in the second domain. In some embodiments, a preconfigured tracking code may be inserted in order to create the patched method. The preconfigured tracking code may call the .NET module of interest in the website via reflection. This may be further explained in conjunction with FIGS. 2-5. In an embodiment, the preconfigured tracking code may include a first code and a second code. The first code may be inserted at beginning of the patched method and the second code may be inserted at end of the patched method. In such an embodiment, the first code and the second code may be used as reference points in the future, the patched method creation module 108 may also include a modification module (not shown in FIG. 1) for modifying a Common Intermediate Language (CIL)/Intermediate Language (IL) code corresponding to the patched method in runtime. In some embodiments, the patched method creation module 108 of the monitoring server 102 may be communicatively coupled to the calling module 110 of the web server 104.

The calling module 110 may be configured to call the patched method in the second domain. The patched method may be called by the calling module 110 upon encountering the corresponding .NET module. Further the calling module 110 may be operatively coupled to the monitoring module 112. The monitoring module 112 may be configured to monitor a behaviour of the patched method in the second domain. The monitoring module 112 may be communicatively coupled to the notification generation module 114 to transfer the monitored data.

The notification generation module 114 may be configured to generate a notification when the website is unloaded. The notification may be provided to the monitoring server 102 via standard notification mechanisms. Further, in some embodiments, the second domain may be updated with information corresponding to unavailability of the unloaded website upon generating the notification in the second domain. Additionally, in some embodiments, operation of the calling of the patched method of the unloaded website in a first domain (i.e., the web domain) to the second domain may be terminated in the system 100. Further, the web server 104 may also include an identification module (not shown in FIG. 1) for identifying the one or more of the set of .NET modules in a source code of the website in the first domain.

Figure 2:
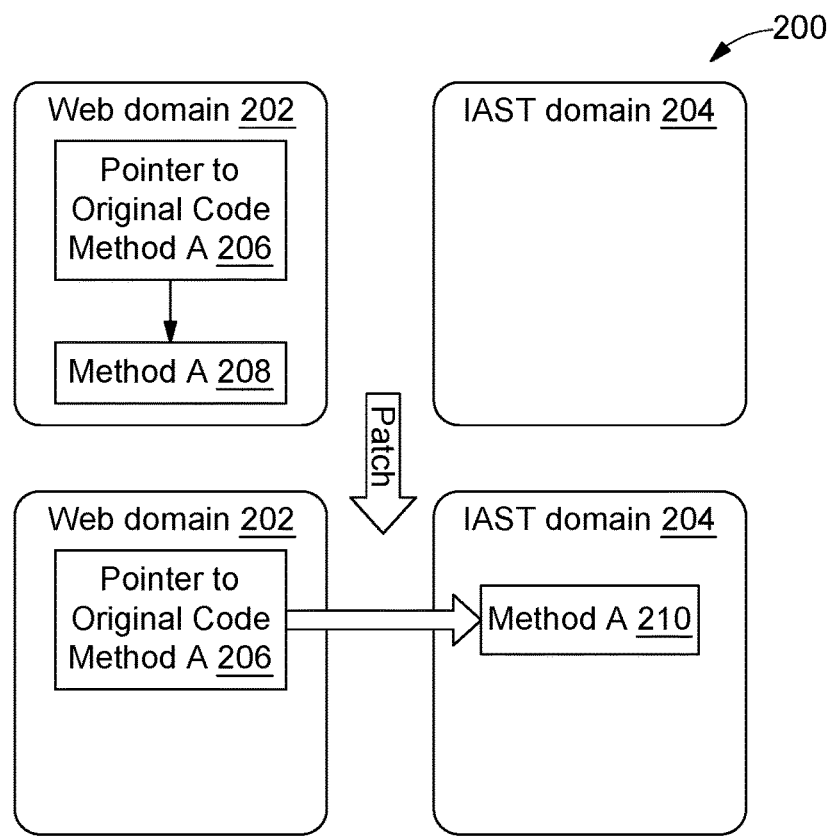
FIG. 2 illustrates a block diagram of a system for patching of all required methods in the new domain, in accordance with some embodiments of the present disclosure.

Referring now to FIG. 2, a system 200 for patching of all required methods in the new domain is illustrated, in accordance with some embodiments of the present disclosure. FIG. 2 is explained in conjunction with FIG. 1. The system 200 includes a web domain 202 and an Interactive Application Security Testing (IAST) domain 204. In an embodiment, a web server (for example, the web server 104) may include the web domain 202 hosting a website. The website may include a set of .NET modules. It should be noted that one or more of the set of .NET modules may be of interest for monitoring or tracking for various applications such as, but not limited to, security testing, debugging, etc. By way of an example, the IAST domain 204 may be initiated on a monitoring server (for example, the monitoring server 102) when the website hosted by the web server is loaded for the first time.

The web domain 202 may include a plurality of methods (For example, a method A 208) and a pointer (for example, a pointer 208) to each of the plurality of methods. As illustrated in FIG. 2, the method A 208 may have corresponding pointer to original code method A 206. As will be appreciated, a pointer is a variable whose value is an address of a second variable i.e., direct address of memory location of the second variable. Further, a patched method A 210 may be created corresponding to each of the one or more of the .NET modules in the IAST domain 204. The patched method 210 may be created by calling the method A 208 via reflection. It should be noted that the patched method may be created by inserting a preconfigured tracking code. In an embodiment, the preconfigured tracking code may include a first code and a second code. The first code may be inserted before the reflection of the method A 208 and the second code may be inserted after the reflection of the method A 208 in the IAST domain 204. This is further explained in detail in conjunction with FIG. 3.

Further, the behaviour of the patched method A 210 may be monitored via the preconfigured tracking code in the IAST domain 204. Thus, creation of the patched method A 210 may allow monitoring of the method A 208 in real-time without shutting down the website on the web server.

Figure 3:
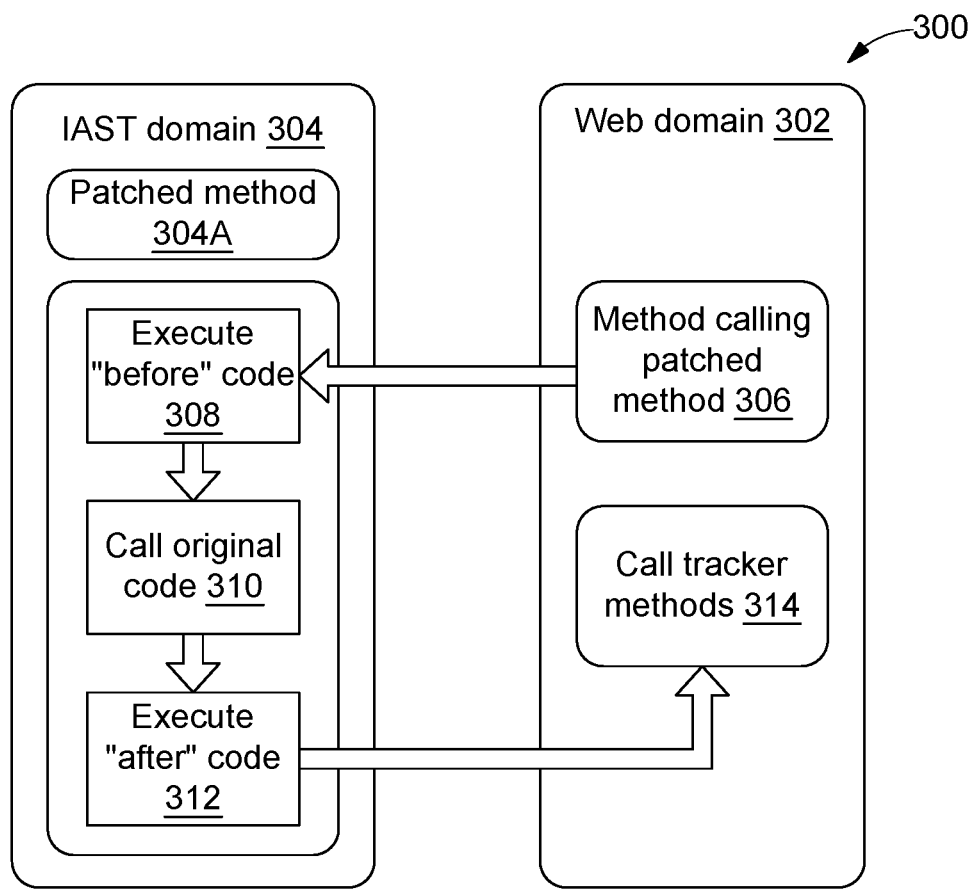
FIG. 3 illustrates a block diagram of a system for calling methods of interest from a web domain to an IAST domain via a reflection, in accordance with some embodiments of the present disclosure.

Referring now to FIG. 3, a system 300 for calling methods of interest from a web domain 302 to an IAST domain 304 via a reflection is illustrated, in accordance with some embodiments of the present disclosure. FIG. 3 is explained in conjunction with FIG. 1 and FIG. 2. The system 300 may include a web domain 302 (same as the web domain 202) and an IAST domain 304 (same as the IAST domain 204). The IAST domain 304 may include a patched method 304A (same as the patched method A 210) corresponding to a method of interest. It should be noted that the method of interest is one of the set of .NET modules in the website. Further, to create the patched method 304*a*, a preconfigured tracking code may be inserted in the IAST domain 304. The preconfigured tracking code may include a first code and a second code. In an embodiment, the first code may be inserted at the beginning of the code corresponding to the patched method 304*a* and the second code may be inserted at the end of the patched method 304*a*.

Various steps may be performed in system 300 to call methods of interest from the web domain via reflection to the IAST domain. At step 306, the patched method may be called to the IAST domain via reflection. At step 308, the 'before code' (i.e., the first code of the preconfigured tracking code) may be executed. At step 310, original code corresponding to the method of interest may be called. At step 312, the 'after code' (i.e., the second code of the preconfigured tracking code); may be executed. Thereafter, at step 314, the tracker methods (i.e., the preconfigured tracking code) of the IAST domain 304 may be called. The tracker methods may facilitate monitoring of the behaviour of the method of interest of the website in real-time in the IAST domain 304.

It should be noted that the .NET framework allows libraries to be deployed in Global Assembly Cache (GAC). The libraries are loaded once within a scope of the .NET application. Domains may be used to create isolated runtime inside the scope of a .NET application. Thus, specialized methods may be required for communication of one domain with another domain. It should be noted that memory space of a domain is inaccessible to the other domain. This poses a problem while patching methods as a patch replaces a GAC method pointer with a local domain method pointer. Further, for example, when a GAC method is patched by a domain 'A', and a domain 'B' calls that GAC method, a code corresponding to the domain 'B' may run using the memory space of domain 'A'. As a result, the .NET framework lacks in managing such a situation and finally crashes. Furthermore, the GAC methods cannot be patched more than once. Therefore, a GAC patch may only run in one single domain (i.e., the first domain to patch the GAC method).

Figure 4:
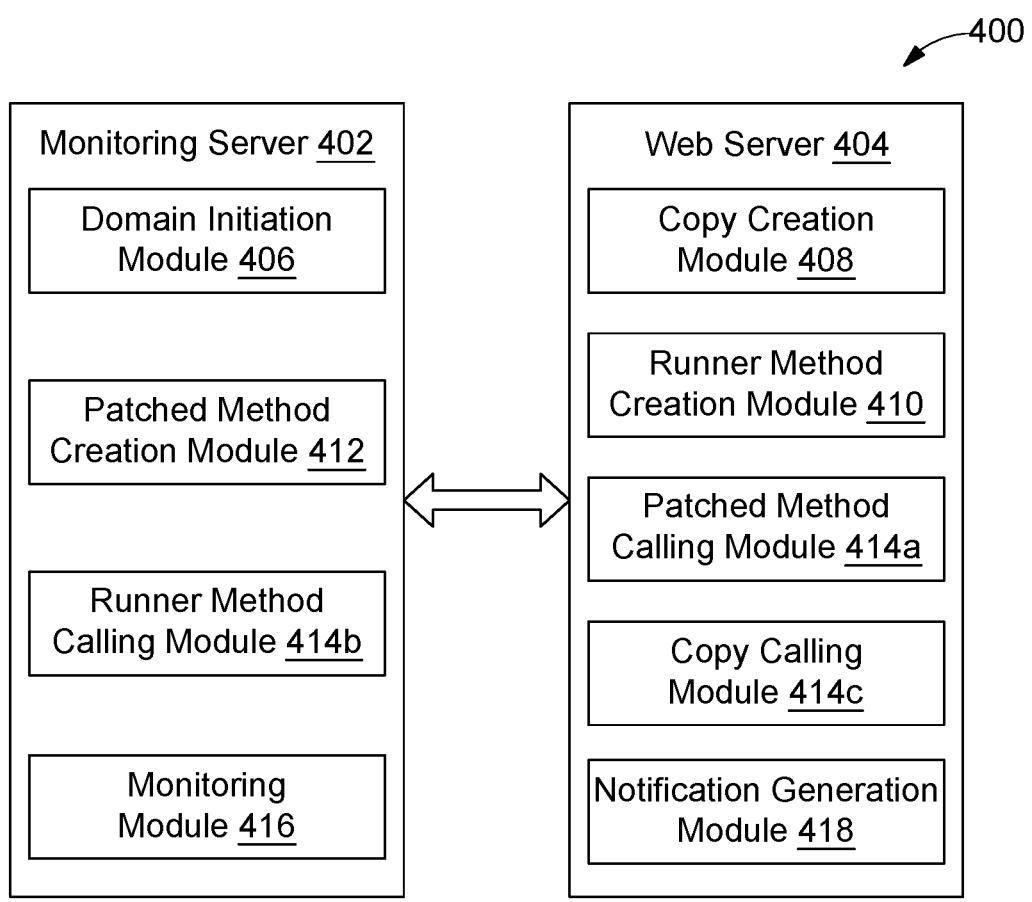
FIG. 4 illustrates a block diagram of a system for managing patched Global assembly cache (GAC) methods for websites running in a .NET framework environment, in accordance with some embodiments of the present disclosure.

Referring now to FIG. 4, a system 400 for managing patched GAC methods for websites running in a .NET framework environment is illustrated, in accordance with some embodiments of the present disclosure. FIG. 4 is explained in conjunction with FIGS. 1-3. In some embodiments, the system 400 may include a monitoring server 402 and a web server 404 communicatively coupled to each other. The monitoring server 402 may further include a domain initiation module 406, a patched method creation module 412, a runner method calling module 414*b*, and a monitoring module 416. The web server 404 may further include a copy creation module 408, a runner method creation module 410, a patched method calling module 414a, a copy calling module 414c, and a notification generation module 418. Further, the system 400 may also include a data store (not shown in FIG. 4) in order to store intermediate results generated by the modules 406-418.

In an embodiment, the monitoring server 402 may correspond to an Interactive Application Security Testing (IAST) domain and the web server 404 may correspond to a web domain. It should be noted that the web server 404 may host a website that may be accessed by a plurality of users in real-time. The monitoring server 402, through the various techniques disclosed in the present disclosure, may monitor behaviour of one or more components (of the website) including GAC methods, without affecting experience of the plurality of users.

The domain initiation module 406 may be configured to initiate a second domain (i.e., the IAST domain). The second domain may be initiated when the website hosted on the web server 404 is loaded for a first time. The website may have a set of .NET modules. It may be noted that one or more .NET modules from the set of .NET modules may be GAC methods of interest. The domain initiation module 406 may be communicatively coupled to the copy creation module 408 and the patched method creation module 412.

The copy creation module 408 may be configured to create a copy of each of the one or more .NET modules of the website. The copy may be created for the purpose of reverse patching. In some embodiments, the copy creation module 408 may create a coded method stub in the first domain. Further, in some embodiments, copy creation module 408 may insert a copy of an IL code of each of the one or more .NET modules into the coded method stub. The copy creation module 408 may be communicatively coupled to the runner method creation module 410.

The runner method creation module 410 may be employed to create a runner method. The runner method may be created to call the copy of each of the one or more .NET modules. The runner method creation module 410 may be communicatively coupled to the patched method creation module 412.

The patched method creation module 412 may be configured to create a patched method corresponding to each of the one or more of the set of .NET modules in the second domain. In some embodiments, a preconfigured tracking code may be inserted in order to create the patched method. The preconfigured tracking code may call the runner method in the website via reflection. This is further explained in conjunction with FIGS. 5-8. In an embodiment, the preconfigured tracking code may include a first code and a second code. The first code may be inserted at beginning of the patched method and the second code may be inserted at end of the patched method. In such an embodiment, the first code and the second code may be used as reference points in the patched method. In some embodiments, the patched method creation module 412 of the monitoring server 402 may be communicatively coupled to the patched method calling module 414a of the web server 404.

The patched method calling module 414a may be configured to call the patched method in the second domain. The patched method may be called by the patched method calling module 414a upon encountering the corresponding .NET module. Further, the runner method calling module 414b may call the runner method from the web server 404 via a reflection in order to call the patched method. Further, the copy calling module 414c may call the copy of the corresponding .NET module from the monitoring server 402 via reverse patching.

The monitoring module 416 may be configured to monitor a behaviour of the patched method in the second domain. The monitoring module 416 may be communicatively coupled to the notification generation module 418 to transfer the monitored data. The notification generation module 418 may be configured to generate a notification when the website is unloaded. The notification may be provided to the monitoring server 402 via standard notification mechanisms.

Further, in some embodiments, the second domain may be updated with information corresponding to unavailability of the website upon generating the notification in the second domain. Additionally, in some embodiments, operation of the calling of the patched method of the unloaded website in a first domain (i.e., the web domain) to the second domain may be terminated in the system 400. Further, the web server 404 may also include an identification module (not shown in FIG. 4) for identifying the one or more of the set of .NET modules in a source code of the website in the first domain.

Figure 5:
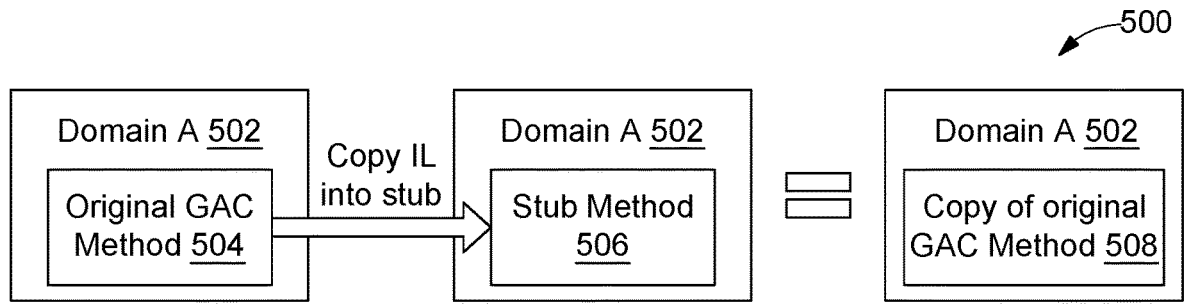
FIG. 5 illustrates a block diagram of a system for creating a copy of an original GAC method in a web domain, in accordance with some embodiments of the present disclosure.

Referring now to FIG. 5, a system 500 for creating a copy of an original GAC method 508 in a web domain is illustrated, in accordance with some embodiments of the present disclosure. FIG. 5 is explained in conjunction with FIG. 4. The system 500 may include a domain 'A' 502. The domain 'A' 502 may correspond to a web domain hosting a website. Source code of the website may include an original GAC method 504. Further, a coded method stub (for example, a stub method 506) may be created within the domain 'A' 502. Further, IL code of the original GAC method 504 may be copied onto the stub method 506 in runtime to create the copy of original GAC method 508. Therefore, if the stub method 506 is called by a method of another domain, the original GAC method 504 will not be called. Therefore, the other domain may run the stub method 506 without using the memory space of domain 'A' 502 through reverse patching. This is further explained in conjunction with FIGS. 6-8. In an embodiment, a stub method may be created once for every patched method (that includes at least one GAC method) for every domain.

Figure 6:
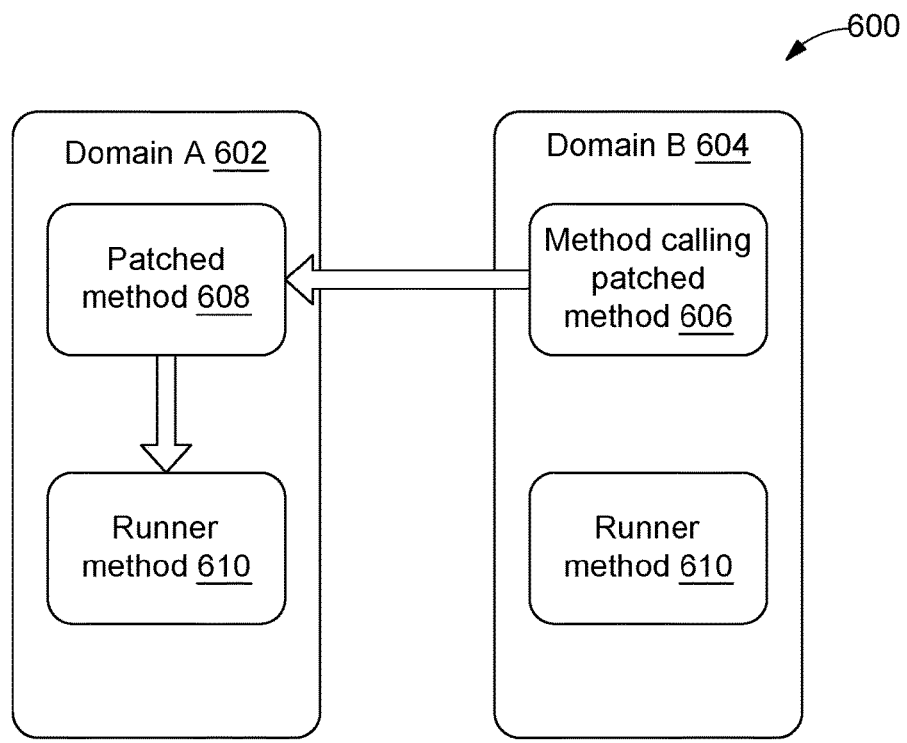
FIG. 6 illustrates a block diagram of a system for creating a runner method in a web domain, in accordance with some embodiments of the present disclosure.

Referring now to FIG. 6, a system 600 for creating a runner method in a web domain is illustrated, in accordance with some embodiments of the present disclosure. FIG. 6 is explained in conjunction with FIG. 5. The system 600 may include a domain 'A' 602 and a domain 'B' 604. The domain 'A' 602 may correspond to the web domain or the first domain. The domain 'B' 604 may correspond to the IAST domain or the second domain. The domain 'B' 604 may include a method calling patched method 606. The method calling patched method 606 may call a patched method 608.

Once a reverse patch exists for a domain, it may be called directly. For this, a method (i.e., the runner method 610) may be created that may call the required reverse patch. For example, if two methods 'M1' and 'M2' are patched, then the runner method 610 may simply call the methods based on an internal logic such as switch/case.

In some embodiments, the patched method 608 exists in in the domain 'A' 602 but a copy of the runner method 610 may exist in each domain. When the domain 'B' 604 calls the patched method 608, the code execution jumps to the domain 'A' 602. Further, calling the runner method 610 may then continue the code execution in the domain 'A' 602. However, the code is needed to be continued in the domain 'B' 604.

To resolve this issue, the patched method 608 may jump the code execution to the domain 'B' 604 by using a reflection. The reflection searches for the code execution in runtime and is capable to find the correct runner method 610 in the domain 'B' 604 to run the runner method 610.

Figure 7:
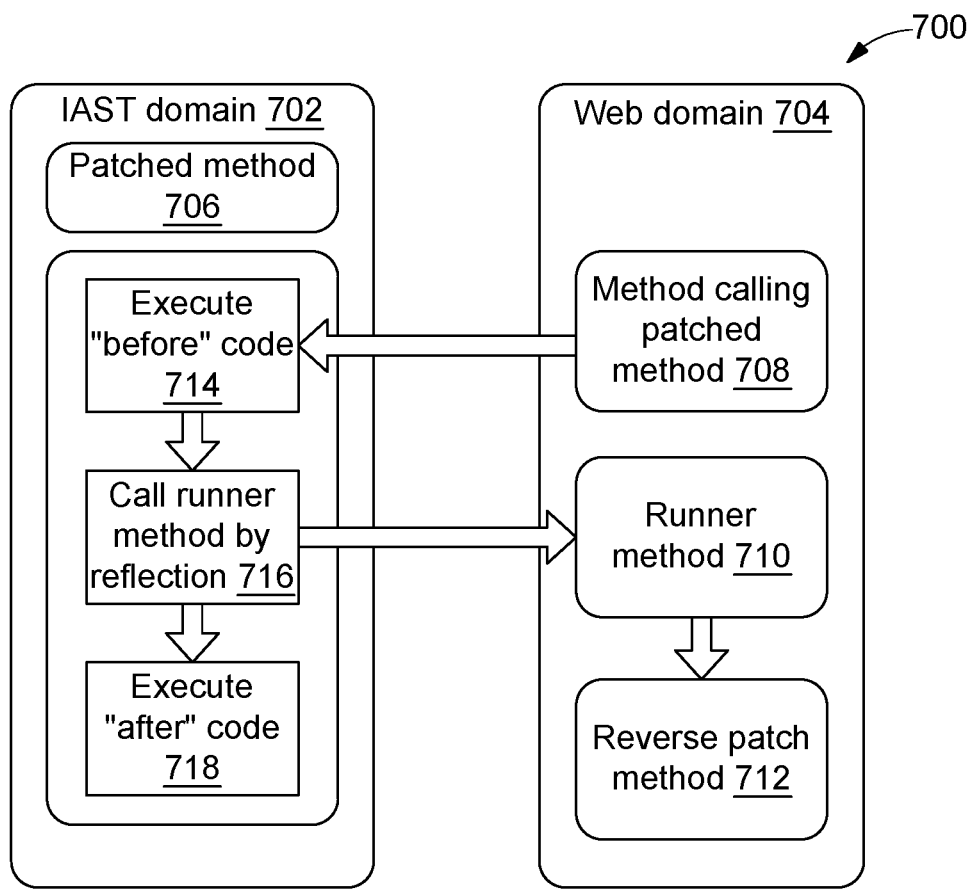
FIG. 7 illustrates a control logic for managing patched Global assembly cache (GAC) methods for websites running in a .NET framework environment, in accordance with some embodiments of the present disclosure.

Referring now to FIG. 7, a control logic 700 for managing patched Global assembly cache (GAC) methods for websites running in a .NET framework environment is illustrated, in accordance with some embodiments of the present disclosure. FIG. 7 is explained in conjunction with FIG. 6. The control logic 700 may include an IAST domain 702 and a web domain 704. The IAST domain 702 may include a patched method 706. Further, the web domain 704 may include a method calling patched method 708, runner method 710, and reverse patch method 712.

In a regular patching, a code is inserted before and after the original code. However, when the patches are created to the GAC methods, the original code may be ignored or may not be called. Hence, the original code may not run at all. Instead, the new patched method may simply run a "before" logic, call the runner method, and then an "after" logic. However, calling the runner method may be inadequate as when the patch is called, the code is being executed in the web domain 704.

Further, the web domain 704 runs a code that calls the patched method 706. The patched method 706 executes a "before" code 714 (before instructions) and then calls the runner method by the reflection 716. Hence, the runner method 710 may be called in the IAST domain 702 and the runner method 710 may further call the reverse patch method 712. The code may then jump back to the IAST domain 702 and continue with the "after" code 718 (after instructions).

It should be noted that the system 400 may be implemented in programmable hardware devices such as programmable gate arrays, programmable array logic, programmable logic devices, or the like. Alternatively, the system 400 may be implemented in software for execution by various types of processors. An identified engine/module of executable code may, for instance, include one or more physical or logical blocks of computer instructions which may, for instance, be organized as a component, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for managing patched GAC methods for websites running in .NET framework environment. For example, the system 400 may manage the patched GAC methods for websites, by the process discussed herein. In particular, as will be appreciated by those of ordinary skill in the art, control logic and/or automated routines for performing the techniques and steps described herein may be implemented by the system 400 either by hardware, software, or combinations of hardware and software. For example, suitable code may be accessed and executed by the one or more processors on the system 400 to perform some or all of the techniques described herein. Similarly, application specific integrated circuits (ASICs) configured to perform some or all the processes described herein may be included in the one or more processors on the system 400.

Figure 8:
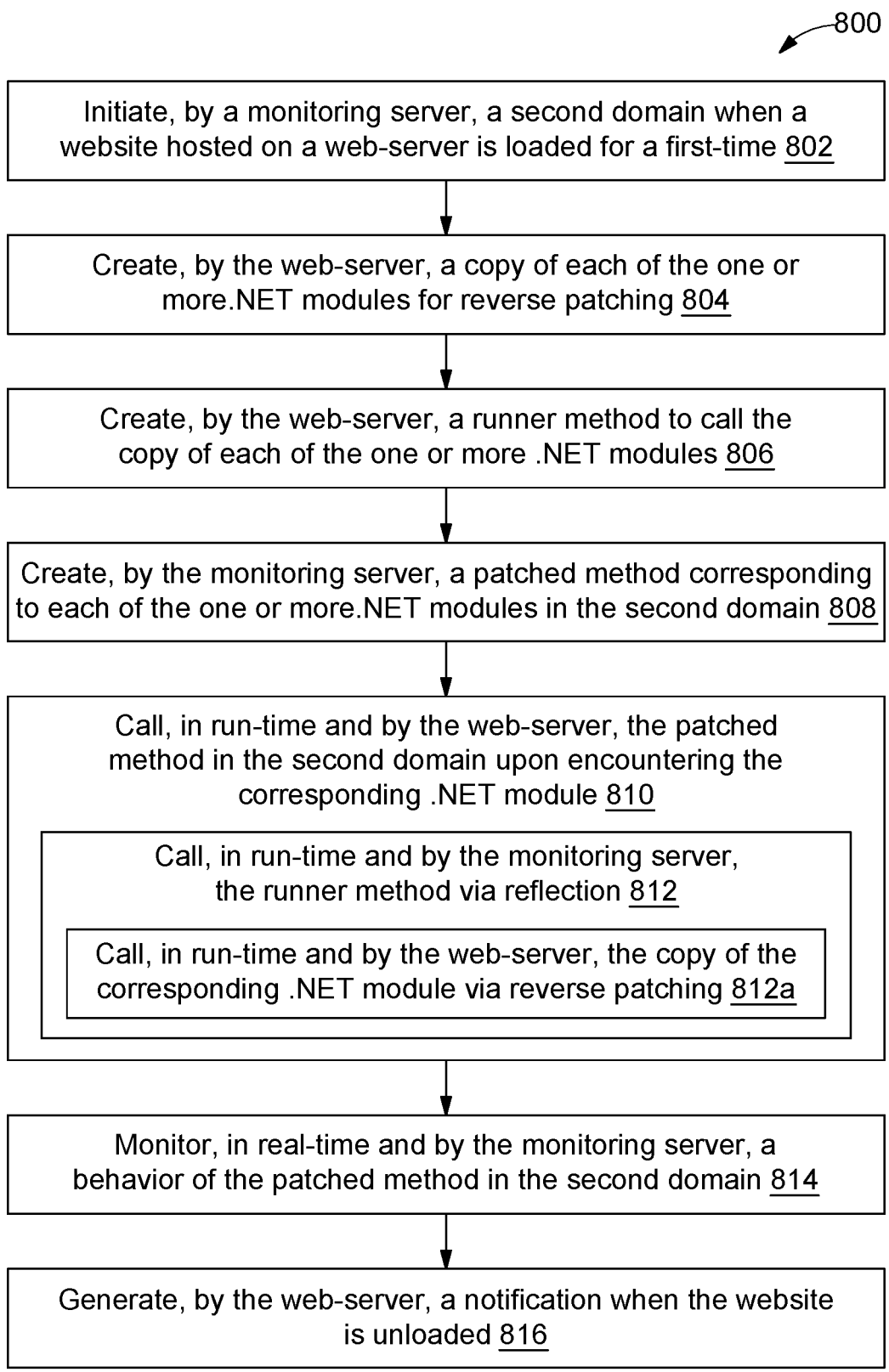
FIG. 8 illustrates a flowchart of a method of managing patched Global assembly cache (GAC) methods for websites running in a .NET framework environment, in accordance with some embodiments of the present disclosure.

Referring now to FIG. 8, an exemplary process 800 for managing patched GAC methods for websites running in a .NET framework environment is depicted via a flow diagram, in accordance with some embodiments of the present disclosure. Each step of the process 800 may be performed by a monitoring server (for example, the monitoring server 402) and a web server (for example, the web server 404) and. FIG. 8 is explained in conjunction with FIGS. 4-7.

At step 802, a second domain (e.g., an IAST domain) may be initiated. The second domain may be initiated when a website hosted on the web-server is loaded for a first-time. This step is performed by the domain initiation module 406 of the monitoring server 402. It should be noted that the website may include a set of .NET modules. Further, it should be noted that one or more of the set of .NET modules are GAC methods of interest. In some embodiments, the one or more of the set of .NET modules in a source code of the website in the first domain may be identified.

At step 804, a copy of each of the one or more .NET modules may be created for reverse patching. It should be noted that the copy creation module 408 may be utilized for creating the copy of each of the one or more .NET modules. In some embodiments, a coded method stub may be created by the web server in the first domain. Additionally, in some embodiments, a copy of an IL code of each of the one or more .NET modules may be inserted into the coded method stub.

Thereafter, at step 806, a runner method may be created using the runner method creation module 410 of the web server 404. The runner method may be created to call the copy of each of the one or more .NET modules.

At step 808, a patched method corresponding to each of the one or more of the set of .NET modules may be created by the patched method creation module 412 of the monitoring server 402. It should be noted that the patched method may be created in the second domain (i.e., the IAST domain). In some embodiments, in order to create the patched method for a .NET module, a preconfigured tracking code may be inserted. The preconfigured tracking code may include a first code and a second code. The first code may be inserted at beginning of the patched method. The second code may be inserted at end of the patched method. The preconfigured tracking code may call the runner method in the website via reflection. In some embodiments, a CIL/IL code corresponding to the patched method may be modified in runtime.

At step 810, the patched method in the second domain may be called in run time by the patched method calling module 414a of the web-server 404. It should be noted that calling may be performed upon encountering the corresponding .NET module. Further, in some embodiments, at step 812, to call the patched method, the runner method may be called via reflection. And, at step 812a, to call the runner method, the copy of the corresponding .NET module may be called via the reverse patching.

Thereafter, at step 814, a behavior of the patched method may be monitored in the second domain by the monitoring module 416 of the monitoring server 402. At step 816, a notification may be generated, by the notification generation module 418 of the web server 404, when the website is unloaded. It should be noted that standard notification mechanisms may be used for providing the notification to the monitoring server 402. Further, in some embodiments, to generate the notification, the second domain may be updated with information corresponding to unavailability of the website upon generating the notification in the second domain. In some embodiments, operation of the calling of the patched method of the unloaded website in the first domain to the second domain may be terminated.

To overcome limitations of existing systems the disclosure provides a solution by creating patches in a specific way that may allow the methods to run in a domain 'B' to call code in domain 'A' even though this is not directly supported by the .NET framework. To achieve this, various steps may be performed by the system 400 including creating a copy of an original method code to be patched in IL code and assigning it to an existing method (i.e., a reverse patch). The steps may further include creating a method that may call a newly created method upon a request. This is created once for every existing domain (i.e, a runner method). The steps may further include creating a patch to the required method. The patch may be created by calling the required code for "before" IAST operations, calling the runner method by reflection, running the reverse patched code by the runner method, and calling the required code for the "after" IAST operations. It should be noted that the runner method may jump between domains and allows the original code to run.

By way of an example, if a method is patched in domain 'A' and called in domain 'B'. In that case, the code may run in domain 'B' with memory space of domain 'A'. Calling the runner method in domain 'A' through reflection may change the environment. Therefore, the runner method may run with code of domain 'B' and memory space of domain 'B'. As a result, the code may run without any issues.

After a method is patched, calling that method may trigger whatever code is added by an application patching the code. However, it is required to run the original code without triggering that logic. For that a coded method (i.e., a stub method) may be created and then IL of the original code may be copied onto the stub method in runtime. This way, calling the stub method may not call the application code. This may be performed once for every patched method, for every domain. Hence, a reverse patching is performed.

Once a reverse patch exists for a domain, it may be called directly. For this, a method (i.e., the runner method) may be created that may call the required reverse patch. For example, if two methods 'M1' and 'M2' are patched, then the runner method may simply call them based on an internal logic such as switch/case.

In a regular patching, a code is inserted before and after the original code. However, when the patches are created to the GAC methods, the original code may be ignored or may not be called. Hence, the original code may not run at all. Instead, the new patched method may simply run a "before" logic, call the runner method, and then the "After" logic. However, calling the runner method inadequate as the domain is still when the patch is called. This is explained in FIG. 6. The patched method exists in only one domain, but a copy of the runner method exists in each domain. When domain 'B' calls the patched method, the code execution jumps to domain 'A'. Therefore, calling the runner method may then continue the code execution in domain 'A'. The code is needed to be continued in domain B.

To resolve this issue, the patched method may jump the code execution to domain 'B' by using a reflection. As, the reflection searches for the code execution in runtime and is capable to find the correct runner method in domain 'B' to run the runner method.

This entire process has been explained in conjunction with FIG. 7. The domain 'B' runs a code that calls the patched method. The patched method executes "before" instructions then calls the runner method by the reflection. Hence, the runner method may be called in the domain 'B and the reverse patch code may be called. The code then may jump back to the domain 'A' that may continue with "after" instructions.

Figure 9:
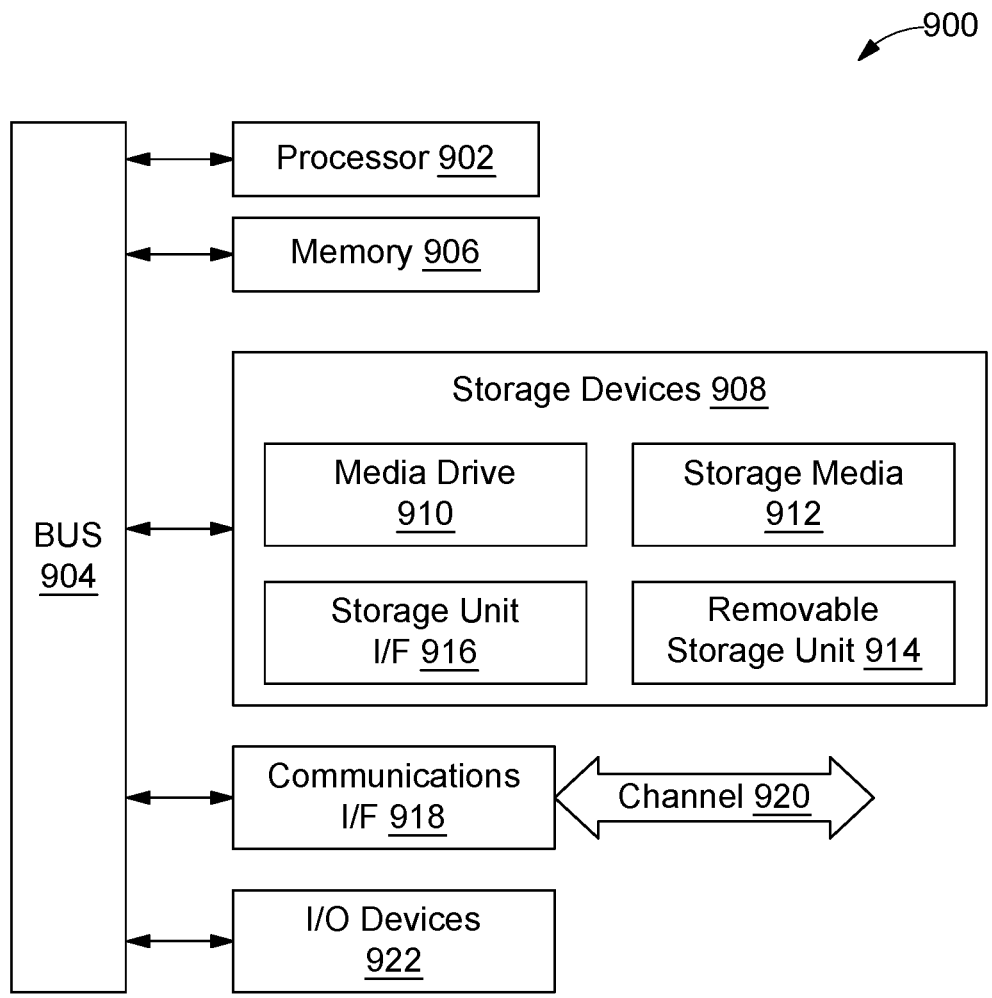
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, an exemplary computing system 900 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 900 may represent, for example, a user device such as a desktop, a laptop, a mobile phone, personal entertainment device, DVR, and so on, or any other type of special or general-purpose computing device as may be desirable or appropriate for a given application or environment. The computing system 900 may include one or more processors, such as a processor 902 that may be implemented using a general or special purpose processing engine such as, for example, a microprocessor, microcontroller or other control logic. In this example, the processor 902 is connected to a bus 904 or other communication medium. In some embodiments, the processor 902 may be an Artificial Intelligence (AI) processor, which may be implemented as a Tensor Processing Unit (TPU), or a graphical processor unit, or a custom programmable solution Field-Programmable Gate Array (FPGA).

The computing system 900 may also include a memory 906 (main memory), for example, Random Access Memory (RAM) or other dynamic memory, for storing information and instructions to be executed by the processor 902. The memory 906 also may be used for storing temporary variables or other intermediate information during execution of instructions to be executed by the processor 902. The computing system 900 may likewise include a read only memory ("ROM") or other static storage device coupled to bus 904 for storing static information and instructions for the processor 902.

The computing system 900 may also include a storage device 908, which may include, for example, a media drives 910 and a removable storage interface. The media drive 910 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 912 may include, for example, a hard disk, magnetic tape, flash drive, or other fixed or removable medium that is read by and written to by the media drive 910. As these examples illustrate, the storage media 912 may include a computer-readable storage medium having stored there in particular computer software or data.

In alternative embodiments, the storage devices 908 may include other similar instrumentalities for allowing computer programs or other instructions or data to be loaded into the computing system 900. Such instrumentalities may include, for example, a removable storage unit 914 and a storage unit interface 916, such as a program cartridge and cartridge interface, a removable memory (for example, a flash memory or other removable memory module) and memory slot, and other removable storage units and interfaces that allow software and data to be transferred from the removable storage unit 914 to the computing system 900.

The computing system 900 may also include a communications interface 918. The communications interface 918 may be used to allow software and data to be transferred between the computing system 900 and external devices. Examples of the communications interface 918 may include a network interface (such as an Ethernet or other NIC card), a communications port (such as for example, a USB port, a micro USB port), Near field Communication (NFC), etc. Software and data transferred via the communications interface 918 are in the form of signals which may be electronic, electromagnetic, optical, or other signals capable of being received by the communications interface 918. These signals are provided to the communications interface 918 via a channel 920. The channel 920 may carry signals and may be implemented using a wireless medium, wire or cable, fiber optics, or other communications medium. Some examples of the channel 920 may include a phone line, a cellular phone link, an RF link, a Bluetooth link, a network interface, a local or wide area network, and other communications channels.

The computing system 900 may further include Input/Output (I/O) devices 922. Examples may include, but are not limited to a display, keypad, microphone, audio speakers, vibrating motor, LED lights, etc. The I/O devices 922 may receive input from a user and also display an output of the computation performed by the processor 902. In this document, the terms "computer program product" and "computer-readable medium" may be used generally to refer to media such as, for example, the memory 906, the storage devices 908, the removable storage unit 914, or signal(s) on the channel 920. These and other forms of computer-readable media may be involved in providing one or more sequences of one or more instructions to the processor 902 for execution. Such instructions, generally referred to as "computer program code" (which may be grouped in the form of computer programs or other groupings), when executed, enable the computing system 900 to perform features or functions of embodiments of the present invention.

In an embodiment where the elements are implemented using software, the software may be stored in a computer-readable medium and loaded into the computing system 900 using, for example, the removable storage unit 914, the media drive 910 or the communications interface 918. The control logic (in this example, software instructions or computer program code), when executed by the processor 902, causes the processor 902 to perform the functions of the invention as described herein.

Thus, the present disclosure may overcome drawbacks of traditional systems discussed before. The disclosed method and system in the present disclosure may allow users to run the IAST on web applications and other .NET applications. Further, the users may use the new method to run IAST in real-time on live web sites and applications as the performance hit is minimal. Further, the disclosure provides a significant improvement over the current methods of tracking data in the .NET applications.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for managing patched Global assembly cache (GAC) methods for websites running in a .NET framework environment, the method comprising:
    initiating, by a monitoring server, a second domain when a website hosted on a web-server is loaded for a first-time, wherein the web-server corresponds to a first domain, wherein the website comprises a set of .NET modules, and wherein one or more of the set of .NET modules are GAC methods of interest, selected based on performance impact, security relevance, and operational importance;
    creating, by the web-server, a copy of each of the one or more .NET modules for reverse patching;
    creating, by the web-server, a runner method to call the copy of each of the one or more .NET modules;
    creating, by the monitoring server, a patched method corresponding to each of the one or more .NET modules in the second domain, wherein creating the patched method for a .NET module comprises inserting a preconfigured tracking code that calls the runner method in the website via reflection;
    calling, in run-time and by the web-server, the patched method in the second domain upon encountering the corresponding .NET module, wherein calling the patched method comprises:
        calling, in run-time and by the monitoring server, the runner method via reflection, and wherein calling the runner method comprises:
            calling, in run-time and by the web-server, the copy of the corresponding .NET module via reverse patching;
    monitoring, in real-time and by the monitoring server, a behaviour of the patched method in the second domain; and
    generating, by the web-server, a notification when the website is unloaded, wherein the notification is provided to the monitoring server via standard notification mechanisms.

2. The method of claim 1, further comprising updating the second domain with information corresponding to unavailability of the website upon generating the notification in the second domain.

3. The method of claim 2, further comprising terminating operation of the calling of the patched method of the unloaded website in the first domain to the second domain.

4. The method of claim 1, wherein creating, by the web-server, the copy of each of the one or more .NET modules further comprises:

creating, by the web server, a coded method stub in the first domain; and inserting, by the web server, a copy of an Intermediate Language (IL) code of each of the one or more .NET modules into the coded method stub.

5. The method of claim 1, further comprising identifying the one or more .NET modules in a source code of the website in the first domain.

6. The method of claim 1, wherein the preconfigured tracking code comprises a first code and a second code, and wherein the first code is inserted at beginning of the patched method and the second code is inserted at end of the patched method.

7. A system for managing patched Global assembly cache (GAC) methods for websites running in a .NET framework environment, the system comprising:
   a processor; and
   a memory communicatively coupled to the processor, wherein the memory stores processor-executable instructions, which, on execution, cause the processor to:
      initiate, by a monitoring server, a second domain when a website hosted on a web-server is loaded for a first-time, wherein the web-server corresponds to a first domain, wherein the website comprises a set of .NET modules, and wherein one or more of the set of .NET modules are GAC methods of interest, selected based on performance impact, security relevance, and operational importance;
      create, by the web-server, a copy of each of the one or more .NET modules for reverse patching;
      create, by the web-server, a runner method to call the copy of each of the one or more .NET modules;
      create, by the monitoring server, a patched method corresponding to each of the one or more .NET modules in the second domain, wherein creating the patched method for a .NET module comprises inserting a preconfigured tracking code that calls the runner method in the website via reflection;
      call, in run-time and by the web-server, the patched method in the second domain upon encountering the corresponding .NET module, wherein calling the patched method comprises:
         call, in run-time and by the monitoring server, the runner method via reflection, and wherein calling the runner method comprises:
            call, in run-time and by the web-server, the copy of the corresponding .NET module via reverse patching;
         monitoring, in real-time and by the monitoring server, a behaviour of the patched method in the second domain; and
         generate, by the web-server, a notification when the website is unloaded, wherein the notification is provided to the monitoring server via standard notification mechanisms.

8. The system of claim 7, wherein the processor-executable instructions further cause the processor to update the second domain with information corresponding to unavailability of the website upon generating the notification in the second domain.

9. The system of claim 8, wherein the processor-executable instructions further cause the processor to terminate operation of the calling of the patched method of the unloaded website in the first domain to the second domain.

10. The system of claim 7, wherein the processor-executable instructions further cause the processor to create, by the web-server, a copy of each of the one or more .NET modules by:
   creating, by the web server, a coded method stub in the first domain; and
   inserting, by the web server, a copy of an Intermediate Language (IL) code of each of the one or more .NET modules into the coded method stub.

11. The system of claim 7, wherein the tracking code comprises a first code and a second code, and wherein the first code is inserted at beginning of the patched method and the second code is inserted at end of the patched method.

12. The system of claim 7, wherein the processor-executable instructions further cause the processor to identify the one or more .NET modules in a source code of the website in the first domain.

13. A non-transitory computer-readable medium storing computer-executable instructions for managing patched Global assembly cache (GAC) methods for websites running in a .NET framework environment, the computer-executable instructions configured for:
   initiating a second domain when a website hosted on a web-server is loaded for a first-time, wherein web-server corresponds to a first domain, wherein the website comprises a set of .NET modules, and wherein one or more of the set of .NET modules are GAC methods of interest, selected based on performance impact, security relevance, and operational importance;
   creating a copy of each of the one or more .NET modules for reverse patching;
   creating a runner method to call the copy of each of the one or more .NET modules;
   creating a patched method corresponding to each of the one or more .NET modules in the second domain, wherein creating the patched method for a .NET module comprises inserting a preconfigured tracking code that calls the runner method in the website via reflection;
   calling, in run-time, the patched method in the second domain upon encountering the corresponding .NET module, wherein calling the patched method comprises:
      calling, in run-time, the runner method via reflection, and wherein calling the runner method comprises:
         calling, in run-time, the copy of the corresponding .NET module via reverse patching;
      monitoring, in real-time, a behaviour of the patched method in the second domain; and
      generating a notification when the website is unloaded, wherein the notification is provided to the monitoring server via standard notification mechanisms.

14. The non-transitory computer-readable medium of claim 13, wherein the computer-executable instructions further configured for updating the second domain with information corresponding to unavailability of the website upon generating the notification in the second domain.

15. The non-transitory computer-readable medium of claim 14, wherein the computer-executable instructions further configured for terminating operation of the calling of the patched method of the unloaded website in the first domain to the second domain.

16. The non-transitory computer-readable medium of claim 13, wherein the computer-executable instructions further configured for creating a copy of each of the one or more .NET modules by:

creating, by the web server, a coded method stub in the first domain; and inserting, by the web server, a copy of an Intermediate Language (IL) code of each of the one or more .NET modules into the coded method stub.

17. The non-transitory computer-readable medium of claim 13, wherein the computer-executable instructions further configured for identifying the one or more .NET modules in a source code of the website in the first domain.

18. The non-transitory computer-readable medium of claim 13, wherein the tracking code comprises a first code and a second code, and wherein the first code is inserted at beginning of the patched method and the second code is inserted at end of the patched method.

* * * * *